Jan. 28, 1958     O. L. GARRETSON     2,821,259
TANK MOUNTING ADJACENT RADIATOR FOR VEHICLES
BURNING GASEOUS FUELS
Filed May 11, 1950     2 Sheets-Sheet 1
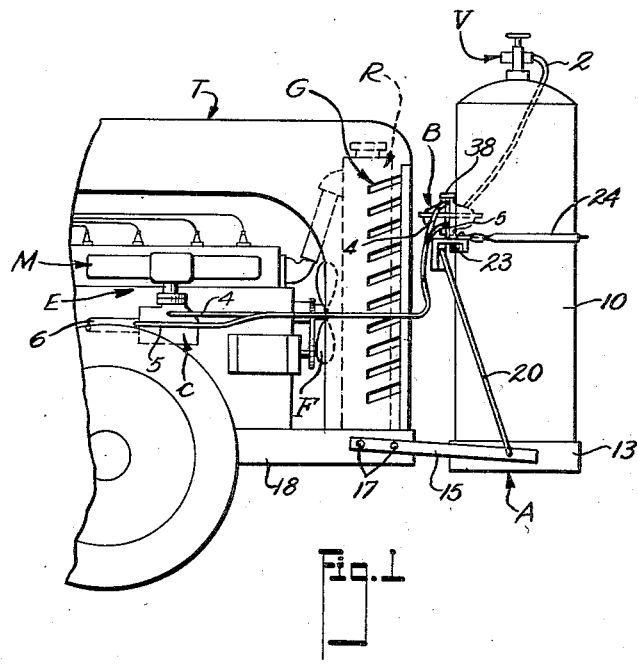
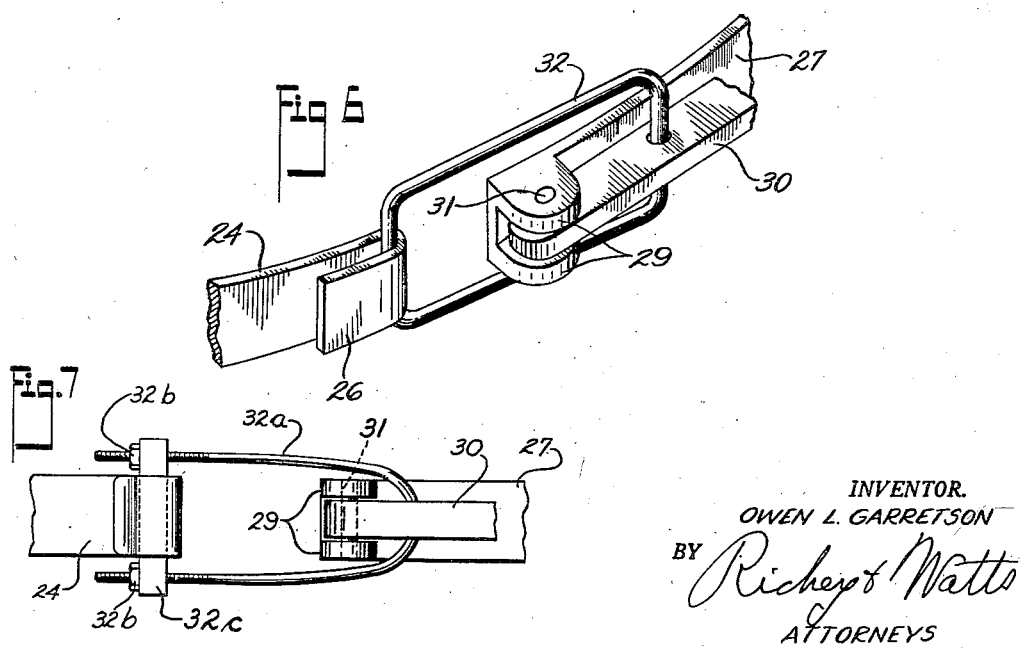
INVENTOR.
OWEN L. GARRETSON
BY Richey & Watts
ATTORNEYS

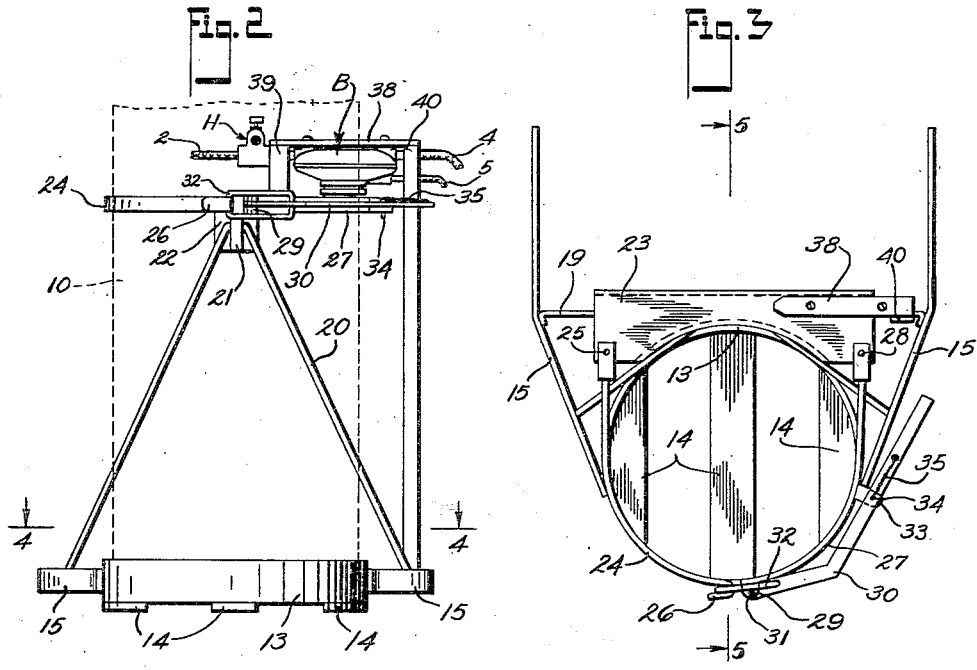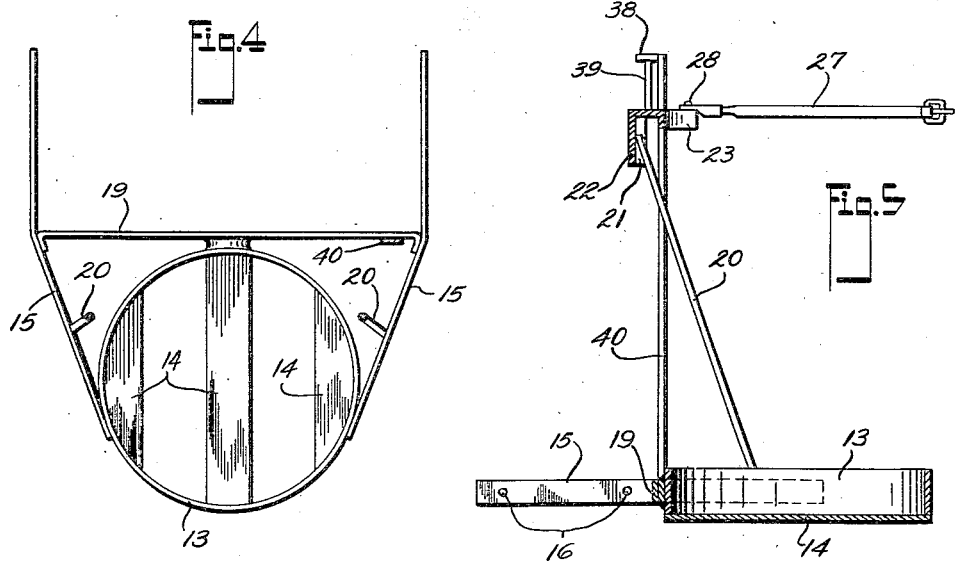

United States Patent Office 2,821,259
Patented Jan. 28, 1958

2,821,259

TANK MOUNTING ADJACENT RADIATOR FOR VEHICLES BURNING GASEOUS FUELS

Owen L. Garretson, Roswell, N. Mex.

Application May 11, 1950, Serial No. 161,417

2 Claims. (Cl. 180—54)

This invention relates to systems for burning liquefied petroleum gases or the like in vehicles having internal combustion engines such as tractors. This invention is a continuation-in-part of my pending application, Serial No. 106,022, filed July 21, 1949, now abandoned. Other parts of the invention disclosed in said application, Serial No. 106,022 are disclosed and claimed in a division thereof, Serial No. 161,418, filed May 11, 1950, now Patent No. 2,683,084 issued July 6, 1954 and in continuation-in-part thereof, Serial No. 161,419, filed May 11, 1950, now Patent No. 2,683,027 issued July 6, 1954.

In many areas it has become economically feasible to burn liquefied petroleum gases such as propane and butane in vehicles and especially in farm tractors. The carburetion systems have been composed for converting tractor engines for use with such fuels. A highly satisfactory system of this nature is described in detail and claimed in my copending application, Serial No. 161,419, filed May 11, 1950, now Patent No. 2,683,027. In such installations there is included pressure regulator means for delivering fuel to the carburetor and a cylinder or container for storing the liquefied fuel under pressure. The cylinder must be mounted on the tractor chassis, and in view of the large number of makes of tractors now on the market to supply a complete line of mounting brackets for the cylinder that will fit every current make of tractor requires a large, expensive inventory.

The principal object of this invention is to mount a fuel cylinder of liquefied petroleum gas on a vehicle in heat-exchange relation with the cooling system of the engine. It is another object of the present invention to reduce the number of mounting brackets required to service the tractors now sold in the trade. Briefly, this is accomplished by providing a platform for the cylinder which has a pair of rearwardly extending arms suitable for attachment to the tractor chassis and front of the radiator, and which has an upper steadying and clamping means for the cylinder that may be attached to a vertical bar forming part of the radiator grill or, alternatively, provided for the purpose of mounting the bracket. I have found that with this form of attaching means I can materially reduce the inventory of brackets without reducing the number of tractors which may be supplied with the equipment.

The aforesaid semi-universal mounting arrangement has another important advantage. When fuel is drawn from the aforesaid containers fuel is supplied by means of vaporization of the liquid within the container and, of course, heat must be supplied to the container for the vaporization to take place. Under heavy loads difficulty has been encountered with excessive chilling of the fuel delivery apparatus due to the relatively high rates of vaporization encountered with consequent loss of pressure. It is also well known that under heavy loads many tractors tend to overheat, which is a condition that is more severe in the warmer climates of this country.

By mounting the container in front of and in heat exchange relationship with the tractor radiator a dual advantage is obtained. First, the cylinder and regulator means mounted adjacent thereto may absorb heat from the radiator tending to facilitate vaporization of the fuel and prevent freezing of the system. Second, this absorption of heat by the cylinder has a beneficial effect in augmenting the action of the tractor cooling system thereby reducing engine-operating temperatures which, at full loads, reduces the exhaust temperatures, protects the exhaust valves, inhibits detonation, and, in general, makes it possible to obtain more power from the engine. Also, in most tractors the extra weight of the container and its contents helps to keep the front wheels on the ground under load.

When desired, as when the tractor or other vehicle is operated in relatively low temperatures, the heat exchange by radiation may be augmented by reversing the usual air flow produced by the engine fan through the engine radiator, so that air is blown through the radiator and then against the fuel cylinder.

The manner in which these and other objects and advantages may be obtained will be apparent from the following detailed description of a preferred embodiment of my invention.

In the drawings:

Fig. 1 is a view of the forward portion of a tractor fitted with the improved liquefied petroleum gas carburetion system constructed in accordance with the present invention.

Fig. 2 is a front elevational view of the improved bracket for supporting the fuel supply container;

Fig. 3 is a top plan view of the bracket;

Fig. 4 is a sectional view taken on line 4—4 of Fig. 2;

Fig. 5 is a sectional view taken on the line 5—5 of Fig. 3;

Fig. 6 is a detail of the clamp arrangement; and,

Fig. 7 is a detail of a modified clamp arrangement.

Referring more particularly to the drawings, the device will be described as installed on a farm tractor. The construction of a preferred form of regulator, its connection to the carburetor, and its action, is described in detail in my copending application, Serial No. 161,419, filed May 11, 1950, now Patent No. 2,683,027 to which reference is made. The tractor T has the usual liquid-cooled engine E, cooled by a radiator R and fan F driven by the engine, protected by a grill G, and having the usual intake manifold M and gasoline carburetor C. Applicant's carburetion system includes a high pressure tank 10 mounted in front of the tractor radiator by a novel bracket assembly A, a high pressure fuel shut-off valve V, a fuel delivery line 2 leading to a high pressure regulator H and a low pressure regulator B. The blades of the fan F may either be arranged to force air past the cylinder 10 and then through the radiator R, in the usual direction of air flow, or may be reversed so as to force air from the engine compartment through the radiato R and then around and past the cylinder 10, so as to transfer heat by convection, as well as by conduction and radiation, from the radiator to the cylinder 10. As described in my pending application, conduit 4 leads from the fuel chamber of B to the venturi of carburetor C, whereas conduit 5 connects the lower or air chamber of B to the intake pipe 6 of the carburetor, and an air filter (not shown) may also be connected to the intake pipe. The connections and operation of the regulator including the air bleed system for the regulator is described in detail in my aforesaid pending application.

Applicant employs a simple, semi-universal cylinder and regulator mounting bracket A so arranged that a comparatively few models of the mounting bracket will serve as equipment for a comparatively large variety of tractors. The bracket A includes a platform for the base of the container in the form of ring 13 which encircles the lower end portion of the container, there being spaced apart slats 14 welded to the ring to support the cylinder. In order to mount the bracket platform on the tractor a pair of arms 15 are attached to ring 13 and extend rearwardly, the rear portions of the arms 15 being parallel and having holes 16 for the reception of bolts 17 by which the bracket is mounted on forward end portions of the side beams 18 of the tractor chassis, or on any other suitable portion of the tractor chassis. Arms 15 may be braced by a brace 19 having its opposite end portions attached, as by welding, to the inner faces of the arms 15 intermediate their ends, the intermediate portion of the brace being welded to ring 13.

An upper clamping and steadying structure for the container is supported by the platform. In the preferred embodiment of the invention a diagonal brace 20 having a substantially inverted V-shape has its lower free end portions attached to the inner faces of arms 15 at points forwardly of the points of attachment of the brace 19 to the arms. The intermediate apex portion of the V-shape brace 20 is received by a suitable opening in a vertically-extending rib 21 on the forward face of a flange 22 which depends from a substantially arcuate-shaped plate 23. In order to clamp the container against plate 23 a pair of strap members are mounted on plate 23. One strap member is pivotally mounted on a plate 23 by clevis 25 and the forward portion of member 24 is substantially arcuate and has its free end portion bent upon itself to form a hook 26.

The other strap member 27 is pivotally mounted as at 28 on the plate 23 at the other side of the tank. Its free end portion is provided with clamping means for association with the strap member 24. In order to mount the clamping means, spaced lugs 29 are formed on the free end of strap member 27 to pivotally receive a clamping lever 30, retained by pin 31. A link is pivotally mounted on the lever 30 rearwardly of the pivoted connection between the arm 27 and the lever 30. The rear end portion of the lever 30 is disposed at an angle of the order of 135° to the forward end portion thereof so that the lever throughout substantially its entire length will lie close to the arm 27.

The structure just described will mount and clamp a container 10 on the tractor. The clamp lever is moved forwardly and the strap members separated to receive the tank. With the latter in place link 32 is placed in hook 26 and the lever forced rearwardly, urging the straps against the tank. In order to secure the lever 30 in clamped position, strap member 27 has secured thereto an ear 33 which is drilled to provide an aperture that is in alignment with an aperture in the lever when the latter is in its clamped position. A pin 34 is held captive to the lever 30 by a chain 35 and fits into the holes in ear 33 and lever 30 to secure the lever.

Preferably, the tank mounting bracket includes means to mount the regulator means B. To this end a bar 38 has its inner end secured to a post 39 which in turn is attached, as by welding or the like, to the upper face of the plate 23. The outer end portion of the bar 38 is secured to the upper end of a standard 40, the lower end portion of which is fixed to the bracket 19, and, if desired, the standard 40 may be further supported by suitable braces secured thereto intermediate its ends and to the plate 23. Bar 38 forms a beam for suspending the regulator which is mounted by suitable screws or the like.

In Fig. 7, a modified over-center clamp is shown that provides some adjustment. Here, link 32a is an open link having adjusting nuts 32b threaded on the free ends thereof and passing through suitable apertures in cross piece 32c mounted on strap 24. Variations in tank diameter may be accommodated by adjusting nuts 32b, it being understood that such nuts may include vibration-proof elastic stop or grip means.

When the container 10 has been emptied it may be replaced by removing the pin 34 from the openings in the ear 33 and lever 30. The lever may then be swung forwardly on its pivot 31 from the position shown in Fig. 6 so that the link 32 can be disengaged from the hook 26. The arms 24 and 27 can then be swung on their respective pivots 25 and 28 away from each other so that the container 10 can be removed from the bracket A. A full container 10 can then be placed upon the bracket A and the arms 24 and 27 can be swung toward each other. Link 32 can then be engaged over the hook 26 and the lever swung rearwardly to the position as shown in Fig. 6. The pin 34 can then be inserted in the openings in the ear 33 and the lever 30.

On large tractors which usually require two fuel supply containers twin cylinder mounting brackets can be employed.

In addition to providing a relatively universal mounting for the cylinder and regulator means, my novel bracket assembly mounts the cylinder in heat exchange relationship with the radiator. This, as explained previously, has the triple advantage of facilitating vaporization of the fuel within the container and regulator, and augmenting the cooling action of the engine's cooling system by chilling the air prior to its passage through the radiator. The aforesaid actions are particularly advantageous at heavy loads, and the engine is on the threshold of detonation.

In addition, the weight of the container materially assists in preventing rearing or lifting of the front wheels of the tractor under heavy loads, and so contributes to the safety of the vehicle.

Having described in detail a preferred embodiment of my invention so that those skilled in the art may practice the same, I contemplate that the scope of my invention is not limited to the aforesaid embodiment but is to be determined by the scope of the appended claims.

What is claimed is:

1. In combination a vehicle adapted to normally move in one direction having a liquid-cooled engine, a radiator therefor, and a fan between said engine and radiator and driven by the engine having blades arranged to force air in said direction from the engine and through the radiator, a storage container of fuel gas liquefied under pressure, means mounting said container on the vehicle on the opposite side of said radiator from said fan and in the stream of air forced through the radiator by the fan, and means for delivering fuel from said container to said engine.

2. In a vehicle having a liquid cooled internal combustion engine, a radiator for said engine, a storage container for liquefied petroleum gas under pressure mounted on said vehicle in radiant heat exchange relationship with said radiator, pressure reducing regulator means mounted on said vehicle having its high pressure side connected to said container and its low pressure side connected to supply vaporized gas to said engine as fuel, a fan driven by said engine having blades arranged to move a stream of air in one direction through said radiator, said regulator means being positioned in the air stream created by said fan downstream from said radiator, whereby said fan moves air through said radiator and then against and around said regulator means to extract heat from the liquid in said radiator and thereafter impart at least a portion of such heat to said regulator means, and said container also being positioned in the air stream created by said fan.

References Cited in the file of this patent

UNITED STATES PATENTS

| | | | |
|---|---|---|---|
| 1,205,982 | Eason et al. | Nov. 28, 1916 |
| 1,303,290 | Gibbs | May 13, 1919 |
| 1,325,318 | Fay | Dec. 16, 1919 |
| 1,519,812 | Schneider | Dec. 16, 1924 |
| 1,716,084 | Percy | June 4, 1929 |
| 1,931,698 | Holzapfel | Oct. 24, 1933 |
| 2,143,194 | Holzapfel | Jan. 10, 1939 |
| 2,169,487 | Ensign | Aug. 15, 1939 |
| 2,188,072 | Brown | Jan. 23, 1940 |
| 2,319,971 | Bodine | May 25, 1943 |
| 2,325,729 | Allin | Aug. 3, 1943 |
| 2,346,763 | Jones | Apr. 18, 1944 |
| 2,402,449 | Rockwell | June 18, 1946 |

FOREIGN PATENTS

| | | |
|---|---|---|
| 680,574 | Germany | Aug. 31, 1939 |
| 218,181 | Switzerland | Mar. 16, 1949 |